(12) United States Patent
Thackston (10) Patent No.: US 8,026,622 B2
(45) Date of Patent: Sep. 27, 2011

(54) GENERATOR WITH FALLING STATOR

(76) Inventor: James D. Thackston, Pinellas Park, FL (US)

( * ) Notice: Subject to any disclaimer, the term of this patent is extended or adjusted under 35 U.S.C. 154(b) by 0 days.

(21) Appl. No.: 12/775,002

(22) Filed: May 6, 2010

(65) Prior Publication Data

US 2010/0327582 A1 Dec. 30, 2010

Related U.S. Application Data

(60) Provisional application No. 61/176,325, filed on May 7, 2009.

(51) Int. Cl.
*F03B 13/00* (2006.01)
*F03B 7/00* (2006.01)
(52) U.S. Cl. .......................... 290/43; 290/54
(58) Field of Classification Search ................ 290/43, 290/44, 53, 54, 55; 310/12
See application file for complete search history.

(56) References Cited

U.S. PATENT DOCUMENTS

| | | | |
|---|---|---|---|
| 2,097,286 A | 10/1937 | McGee | |
| 4,075,603 A | 2/1978 | Snyder | |
| 4,103,194 A | 7/1978 | Anderson | |
| 4,563,375 A | 1/1986 | Ulrich | |
| 4,893,877 A | 1/1990 | Powell | |
| 5,153,473 A | 10/1992 | Russell | |
| 5,245,270 A * | 9/1993 | Akiyama | 322/4 |
| 5,506,453 A | 4/1996 | McCombs | |
| 5,677,583 A | 10/1997 | Kawai | |
| 5,730,094 A | 3/1998 | Morris | |
| 6,848,503 B2 * | 2/2005 | Schultz et al. | 166/66.5 |
| 7,091,628 B1 * | 8/2006 | Balt | 290/54 |
| 7,129,601 B2 * | 10/2006 | Brown et al. | 310/12.31 |
| 7,190,087 B2 * | 3/2007 | Williams | 290/53 |
| 7,285,889 B2 | 10/2007 | Shkondin | |
| 7,323,790 B2 | 1/2008 | Taylor et al. | |
| 7,348,686 B2 * | 3/2008 | Fielder | 290/54 |
| 7,723,860 B2 * | 5/2010 | Nagler | 290/54 |
| 2004/0104631 A1 | 6/2004 | Noguchi | |
| 2005/0280322 A1 | 12/2005 | Tsou | |

FOREIGN PATENT DOCUMENTS

| | | |
|---|---|---|
| FR | 2879680 | 6/2006 |
| JP | 63-18976 A | 1/1988 |

OTHER PUBLICATIONS

Search Report and Written Opinion, PCT/US2010/034069 dated Jul. 13, 2010.

* cited by examiner

*Primary Examiner* — Nicholas Ponomarenko
(74) *Attorney, Agent, or Firm* — Kilpatrick Townsend & Stockton LLP (57) ABSTRACT

A generator is provided including a rotatable pressure vessel with an inner and outer surface. Electromagnets are disposed on the inner surface of the pressure vessel. A biasing structure is configured to rotate within, and independently of, the pressure vessel and extends at least partly along a lengthwise dimension of the pressure vessel. The biasing structure has an axis of rotation that is within the circumference of the pressure vessel, and may be substantially parallel and coincident with a center axis of the pressure vessel. The biasing structure has a center of gravity at a radius away from the center axis of the pressure vessel. Armature coils are disposed on an outer portion of the biasing structure, and are positioned such that a relative motion between the electromagnets and the plurality of armature coils induces a current in the armature coils when a current is applied to the electromagnets. A transfer mechanism is configured to transfer electrical current from first electrical conductors connected to the armature windings to an outside of the pressure vessel.

19 Claims, 9 Drawing Sheets

GENERATOR WITH FALLING STATOR

CROSS-REFERENCES TO RELATED APPLICATIONS

The present application claims priority to U.S. Provisional Application No. 61/176,325 filed May 7, 2009. The contents of the priority application are hereby incorporated herein by reference in their entirety.

BACKGROUND OF THE INVENTION

The present subject matter relates to a means for generating electricity, and more particularly although not exclusively, to systems and methods for generating hydroelectricity.

In recent years, the increase in fossil fuel prices, along with the concern regarding the effect of carbon emissions on the environment, have led to a heightened interest in developing alternative, reusable forms of power generation. Despite this new-found urgency, to date, only a small percentage of the United States' electricity production comes from alternative energy sources. One reason that is holding back the widespread implementation of renewable energy sources is that they are not practical for large-scale power production, or implementation, within the traditional power infrastructure. However, alternative energy sources such as wind and tidal offer potential for clean, renewable, solutions that would be desirable as permanent supplies of electricity.

There are many advantages to harnessing hydroelectric power in comparison to utilizing other alternative energy sources such as wind energy. Seawater is about 850 times as dense as air, so, for the same volume flow rate, moving seawater contains 850 times more kinetic energy. Furthermore, unlike wind flows, major ocean currents are directionally stable and reasonably steady. Despite these advantages, there have been relatively few breakthrough technologies in systems designed to extract energy from steady non-tidal ocean currents.

BRIEF SUMMARY OF THE INVENTION

There are currently several approaches used to provide energy production from renewable energy sources that involve the natural flow of fluids including wind, rivers, tidal and non-tidal currents. Many of these solutions focus on harnessing mechanical energy, usually in the form of a rotating blade structure, and converting this energy using a gearbox to rotate a generator. However, known methods suffer from drawbacks related to the interaction of a rotating blade structure and shaft, including a lack of durability, particularly in underwater applications. For example, current designs that attempt to harness hydroelectricity borrow heavily from wind turbine technology. These ocean turbines with rotating propeller-like blade sets must transfer kinetic energy from moving seawater to a generator rotor through a sealed shaft. If the interior of the generator casing is filled with a gas at low pressure relative to the ambient water, the shaft seal must perform perfectly. The seal may eventually wear out, allowing seawater to leak into the generator casing. Given the additional cost that maintenance of underwater power generators incur, this deficiency can make known hydroelectric solutions impracticable in areas in which they would be more useful, such as in steady non-tidal ocean currents.

An additional problem that the turbine design creates is that the blade diameters are necessarily large. In virtually all ocean currents, flow speeds vary with depth and, thus, for large blade sets, there is significant torque borne by the turbine hub based on the different flow speeds experienced by different areas of the blades. This further reduces the durability of the shaft seals.

There is also a high cost associated with many of the hydroelectric systems in the form of recurrent expenses. The durability of mechanical, magnetic, and electrical systems is important for any commercially-viable ocean energy system. This is due in part to the fact that maintenance procedures may require the generator unit be brought to the ocean surface and transported to a servicing facility. Current designs that borrow from the wind turbine designs usually include a gearbox to convert the torque from the rotor blades into the higher rotational speed required to efficiently produce electricity. These gearboxes need to be lubricated on a regular basis and are relatively complex and thus require more maintenance and are more susceptible to failure.

Finally, all electric generators create waste heat. This is due in large part to the electrical resistance of the electrical conductors. Therefore, all generators must have a means to remove heat without causing significant reductions in efficiency. Some present designs of ocean generators use oil to ensure that internal pressure is equal to the ambient sea water static pressure. This oil absorbs heat from the generator components and thus serves the function of creating a pathway for heat removal. However, the relatively high viscosity of the oil causes very high windage losses and therefore substantially reduces the generator's efficiency.

The present subject matter addresses problems identified in current designs through various aspects of its structure and operational features. According to embodiments of the present subject matter, a biasing structure may be utilized to provide for relative motion between two independently rotatable structures, which may eliminate the need for known blade structures and/or or gearboxes that require routine or regular maintenance. Also, unlike many known systems, embodiments of the present subject matter may utilize certain fluids to dissipate heat from the power generation process, which can increase efficiency. Embodiments of the present invention may also selectively power off electromagnets during rotation of the generator, thereby reducing heat generation and the amount of energy required to power the generator.

Embodiments may include a generator with a rotatable cylindrical pressure vessel, a plurality of electromagnets disposed on an inner surface of the pressure vessel, and a biasing structure that is configured to rotate within, and independently of, the pressure vessel. The biasing structure may extend at least partly along a lengthwise dimension of the pressure vessel and have an axis of rotation that is substantially parallel to and coincident with a center axis of the pressure vessel. The biasing structure may have a center of gravity that is at a radius away from the center axis of the pressure vessel. The generator may also include a plurality of armature coils disposed on an outer portion of the biasing structure, and positioned such that a relative motion between the electromagnets and the plurality of armature coils induces a current in the armature coils when there is a current applied to the electromagnets. The generator may also include a transfer mechanism configured to transfer electrical current from first electrical conductors that are connected to the armature windings to an outside of the pressure vessel.

Embodiments may include a generator with a rotatable pressure vessel, a plurality of first magnets disposed on an inner surface of the pressure vessel, and a biasing structure that extends at least partly along a lengthwise dimension of said pressure vessel. The biasing structure may have an axis of rotation that is within a circumference of the pressure vessel and a center of gravity that is at a radius away from a center axis of the pressure vessel. The generator may also include a plurality of armature coils disposed on the biasing structure and positioned such that relative motion between the first magnets and the plurality of armature coils induces a current in the armature coils. Embodiments may include locating the axis of rotation of the biasing structure substantially coincident with the center axis of the pressure vessel.

Embodiments may include the biasing structure having a rotatable shaft configured to rotate independently of the pressure vessel. The shaft may be parallel to and coincident with the center axis of the pressure vessel. Embodiments may include the shaft having a hollow interior and first electrical conductors located in the hollow interior of the shaft, the first electrical conductors connected to the armature windings.

Embodiments may include the first magnets being electromagnets. A relative motion between the first magnets and the plurality of armature coils may induce a current in the armature coils when current is applied to the first magnets. Embodiments may include a control system that is connected to the first magnets. The control system may be configured to selectively apply current to the first magnets during rotation of the pressure vessel. The control system may be configured to stop supplying current to selected first magnets based on when the selected first magnets are outside of an effective range with respect to the armature coils, and/or a position of the selected first magnets with respect to the biasing structure.

Embodiments may include a starter mechanism with a rotor having permanent magnets disposed around the rotor, starter armature coils disposed opposite the permanent magnets, and third electrical conductors completing an electrical circuit between the starter armature coils and the first magnets. The permanent magnets and the starter armature coils may be positioned opposite to one another at a distance such that relative rotation between the permanent magnets and the starter armature coils produces a current in the starter armature coils. Embodiments may include the electrical circuit between the starter armature coils and the first magnets having a rectifier between the starter armature coils and the first magnets.

Embodiment may include the pressure vessel having no openings that penetrate the inner surface and the outer surface of the pressure vessel, through which mechanical energy is transmitted. Embodiments may include a transfer mechanism configured to transfer electrical current from first electrical conductors connected to the armature windings to an outside of the pressure vessel. Embodiments may include second electrical conductors completing an electrical circuit between the transfer mechanism and windings of the first magnets.

Embodiments may include the biasing structure configured to maintain an operational rotational orientation using a gravitational force to offset a rotational force created by an electromagnetic interaction of the first magnets and the armature coils. Embodiment may include the biasing structure configured such that a gravitational force acting on the biasing structure contributes to a relative rotation between the biasing structure and the pressure vessel when the pressure vessel is rotating.

Embodiments may include a housing outside of the pressure vessel. The housing may be configured to channel an environmental fluid against at least a portion of the outer surface of the pressure vessel. Embodiments may include the housing configured to create at least one accelerated inlet flow on a side of the cylindrical pressure vessel, and to create at least one diffusing flow region with an associated lower pressure area on another side of the pressure vessel.

Embodiments may include, a thermally conducting fluid filling an interior of the pressure vessel. The thermally conducting fluid may be a fluid with a high thermal conductivity and a low molecular weight, such as hydrogen.

Embodiments may include at least some of the plurality of first magnets being electromagnets that are configured to be powered, at least temporarily, by a current delivered from outside of the pressure vessel through a transfer mechanism.

According to further aspects of the invention, methods may include providing a generator including a pressure vessel and a biasing structure, and generating electrical power by subjecting the pressure vessel outer surface to a flowing fluid. Embodiments may include providing an initial current to electromagnets, arranged as described herein, via an external power source or an internal starter mechanism. Providing an initial current to selected electromagnets may be used, for example, to establish an initial operating angle of the biasing structure. Embodiments may include controlling a current applied to the electromagnets in order to maintain the biasing structure at an operating angle.

Further aspects, advantages, and features of the present subject matter will become apparent to those of ordinary skill in the art upon reading and understanding the following detailed description of embodiments.

BRIEF DESCRIPTION OF THE DRAWINGS

Referring to the exemplary drawings wherein like elements are numbered alike in the accompanying Figures.

DETAILED DESCRIPTION OF THE INVENTION

The following detailed description is provided with reference to exemplary embodiments for the ease of description and understanding. Applicant's invention is not limited to the disclosed embodiments, and encompasses other variations that fall within the overall scope of the description provided herein, and the understanding conveyed thereby to one of ordinary skill in the art.

Figure 1:
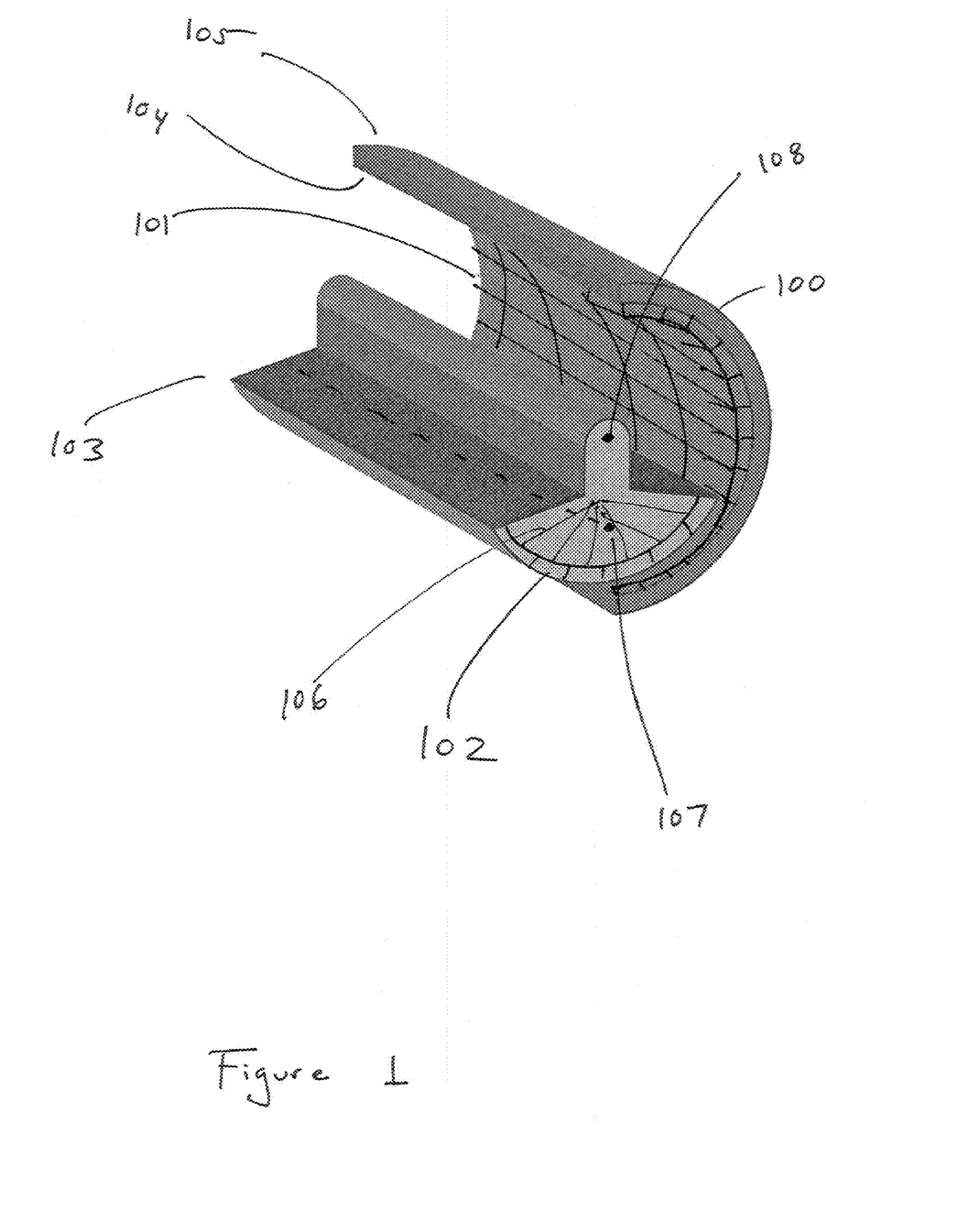
FIG. 1 depicts an isometric cut away view of an exemplary apparatus in accordance with an embodiment of the present invention.

FIG. 1 depicts a cut away view of an exemplary embodiment according to aspects of the present invention. In FIG. 1, magnets 101 are disposed on the inner surface 104 of a rotatable cylindrical pressure vessel 100. The magnets 101 may be electromagnets, permanent magnets, or a combination of both, and may be disposed over the entire portion of the inner surface 104 or some part thereof. As used herein, the term "cylindrical pressure vessel" should be understood generally to refer to a vessel that is capable of maintaining an internal pressure and/or internal fluid that is different from an external pressure and/or external fluid. This term is not meant to be limited to any particular pressure maintaining configuration or parameters, and may include, for example, sealed vessels as well as vessels that otherwise maintain a pressure differential and/or different fluid between the inside of the vessel and outside of the vessel. Preferably, the pressure vessel is a sealed vessel. Likewise, the term "cylindrical" is used in a broad sense, and can be understood to apply generally to three-dimensional shapes that are capable of rotating about a central axis. The rotation may be caused by application of torque on the outer surface of the "cylinder" by a fluid flow. Accordingly, and as will become apparent, the outer surface of the pressure vessel may take various forms, that may not be uniformly circular in cross section, in order to provide, for example, an opposing surface to the flow of fluid, resulting in torque. For example, outer surface 105 may include blades, vanes, or other shapes, irregularities and the like, that interact with a fluid flow across the outer surface 105.

With further reference to FIG. 1, inside the circumference of the pressure vessel 100 is an exemplary biasing structure 103. The biasing structure 103 may be constructed of various materials, and may take various shapes. The biasing structure 103 is depicted with a center of gravity 107 that is at a radius away from a center axis 108 of the pressure vessel 100. In embodiments, the biasing structure 103 may comprise a shaft that may be hollow. As shown, the biasing structure 103 is configured to rotate within, and independent of, the pressure vessel 100. In FIG. 1, a rotational axis of the biasing structure 103 is located substantially parallel to and coincident with the center axis 108 of the pressure vessel 100. However, embodiments may include variations where the rotational axis of the biasing structure 103 is otherwise located within the circumference of the pressure vessel 100.

Figure 2:
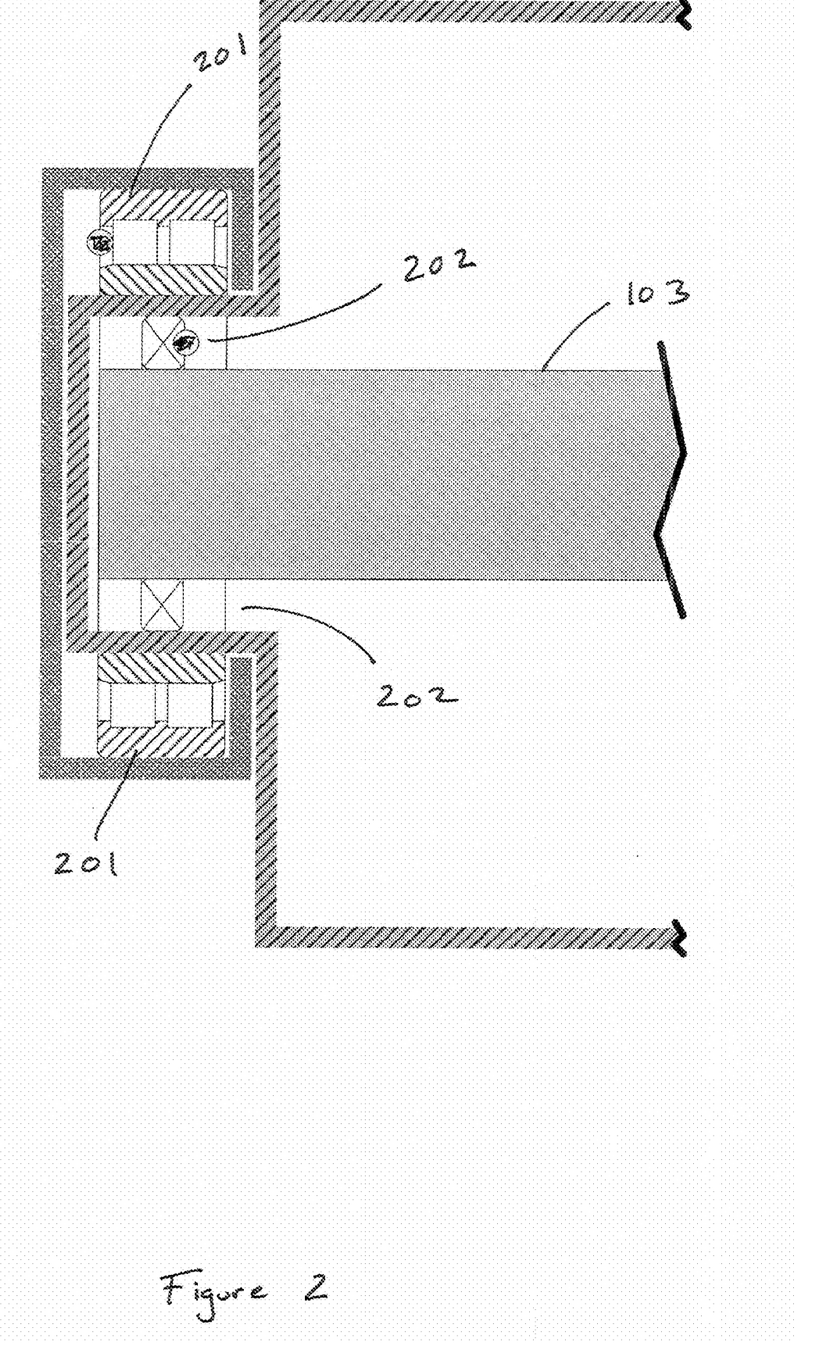
FIG. 2 depicts a sectional view of an exemplary apparatus in accordance with an embodiment of the present invention.

As shown in exemplary manner in FIG. 2, the biasing structure 103 may be suspended with respect to the pressure vessel 100 by various means including, for example, resting in bearing sets 202 located inside the pressure vessel 100.

Returning to FIG. 1, a plurality of armature coils 102 may be disposed on the biasing structure 103. In embodiments, the armature coils 102 may be disposed entirely on an outer portion of the biasing structure 103. The armature coils 103 and the magnets 101 may be positioned such that relative motion between the pressure vessel 100 and the biasing structure 103 induces a current in the armature coils 102, and first electrical conductors 106 may be connected to the armature coils 102. In embodiments, the first electrical conductors 106 may be located inside the biasing structure 103.

With further reference to FIG. 2, a sectional view of an exemplary bearing structure is depicted. As indicated above, the biasing structure 103 may be supported by use of two or more inner bearing sets 202. These inner bearings 202 may be located in the interior of the pressure vessel 100. This bearing arrangement permits the biasing structure 103 to rotate independently of the pressure vessel 100. If bearing sets 202 comprise ball, thrust, or roller bearings, the outer race of the bearing assembly may be rigidly attached to the pressure vessel 100. Pressure vessel 100 may be supported by two or more main bearings 201 located at ends of the pressure vessel 100. Thus, the pressure vessel 100 may be configured to rotate independently of the biasing structure 103. The use of other bearing structures that provide for the described independent rotations are also envisioned. The use of the independently rotatable biasing structure 103, with an offset center of gravity, within the independently rotatable pressure vessel 100 allows for relative rotational movement between the armature and the magnets without a shaft of the biasing structure 103 penetrating to the outside of the pressure vessel. This may be particularly advantageous in the context of submerged hydroelectric power generators by improving the durability and reducing maintenance of the generators.

Figure 3:
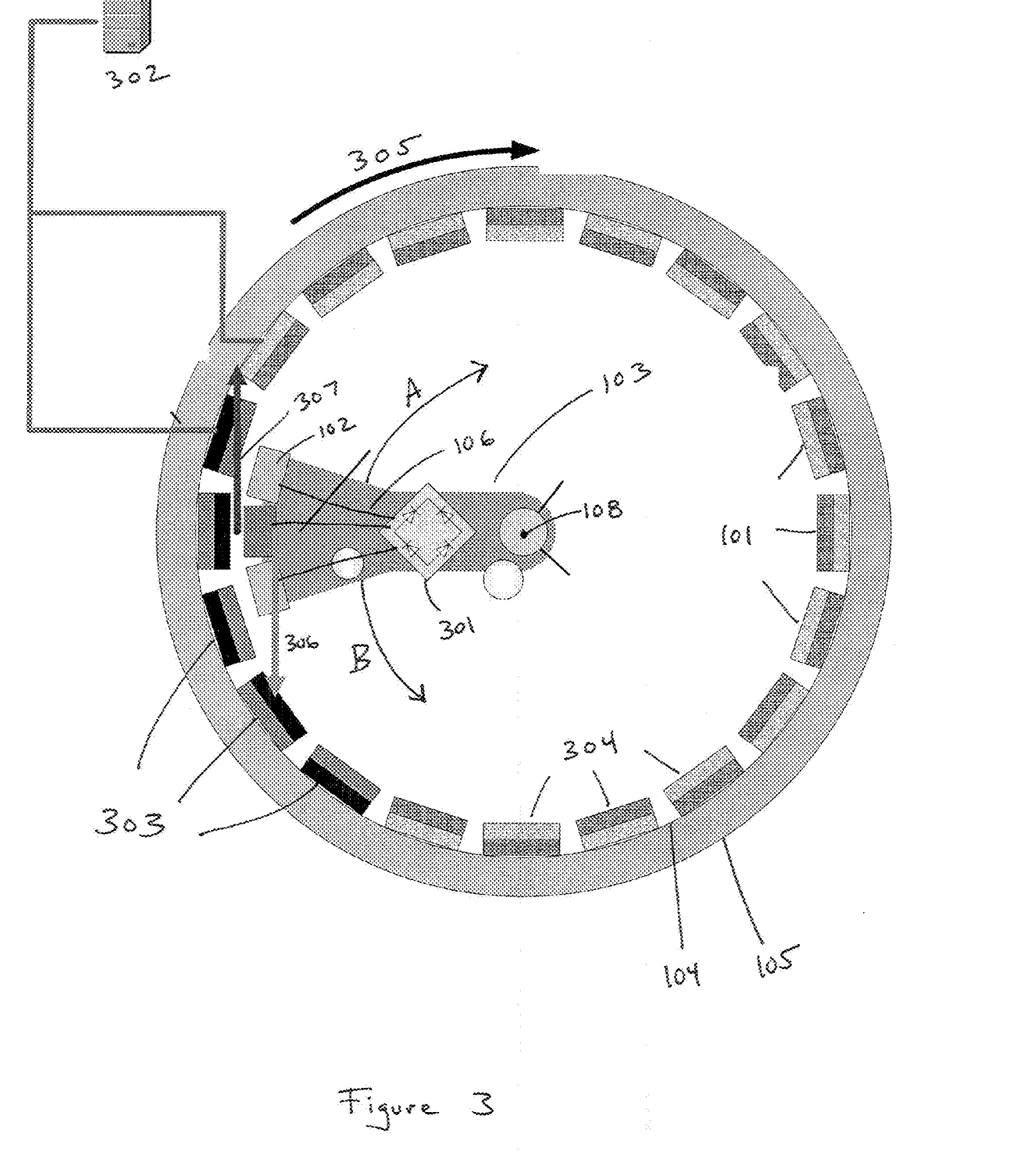
FIG. 3 depicts a sectional view of an exemplary apparatus in accordance with an embodiment of the present invention.

With reference to FIG. 3, a depiction of a cross-sectional view, and partial schematic, of an exemplary generator in operation is shown. Magnets 101 are depicted as electromagnets and are disposed around the circumference of the inner surface 104 of the pressure vessel 100, and provide the magnetic field required to induce a current in the armature coils 102.

In embodiments, the generator may be configured such that, when an external torque 305 is applied to the pressure vessel 100, the pressure vessel 100 rotates in direction "A", and the biasing structure 103 is maintained at a position, for example, substantially at a ninety (90) degree angle from dead hang as shown, or other. The position may be an acceptable range of positions as well such as, for example, 45-90 degrees, 45-135 degrees, 60-90 degrees, 60-120 degrees, 80-90 degrees, or 80-100 degrees. For example, as discussed further below, a control system 302 may be used to reduce an electromagnetic force 307 such that the biasing structure 103 may return to an acceptable position within the range by rotating in direction "B" even after the rotation of the biasing structure has exceeded a maximum torque vector, i.e. ninety degree rotation of the center of gravity from a dead hang with zero gravitational torque.

The movement of the electromagnets 101 disposed around the pressure vessel inner surface 103 provides the motion required to generate a current, in this case an alternating current, in the armature coils 102 when the pressure vessel 100 rotates in direction "A". Relative motion between the rotating pressure vessel 100 and the biasing structure 103 is provided by the gravitational force 306 acting on the center of mass of the biasing structure 103, e.g. the center of mass 107 located some radius away from the pressure vessel cylinder axis 108. In embodiments, a substantially steady state may be obtained when the moment arm created by the gravitational force is approximately equal to the electromagnetic resistive force 307 created by the relative motion of the electromagnets 101 and the armature coils 102. To further maintain the biasing structure 103 at a substantially steady rotational position within the pressure vessel 100 despite fluctuations in rotational velocity etc., a control system 302 may be configured to adjust the electromagnet field strength created by the electromagnets 101 by varying the current flow through the windings, as required. As indicated above, this may be used to maintain the biasing structure 103 within an acceptable rotational position and/or range of positions When the biasing structure 103 is positioned into a substantially ninety (90) degree orientation by electromagnetic resistive force 307, the moment arm created by gravitational force 306 is generally at its greatest. Therefore, the greatest current for a given rotational velocity may be provided to the electromagnets 101 when the biasing structure 103 is oriented close to 90 degrees, resulting in the greatest induced current for the given rotational velocity. In general, gravity is responsible for the power transfer from the externally applied torque 305 to the electrical energy generated at the armature coils 102. As shown in FIG. 3, the current may be alternating when it leaves the armature coils 102 and may be converted to direct current by a bridge rectifier circuit 301.

Continuing with reference to FIG. 3, select electromagnets 303 moving past the biasing structure 103 may be energized, while other electromagnets 304 that have moved away from the biasing structure 103 may be de-energized. This may be achieved by use of the control system 302 that may include a computer system connected to the electromagnets 101 and sensors configured to detect the position of the biasing structure 103 and/or pressure vessel 100. The control system 202 may be configured to control the current to the electromagnets 101. This may include the control system 302 stopping a current flow to those electromagnets 304 that have moved past the biasing structure 103, allowing current flow to the electromagnets 303 as they move past the armature coils 102 on biasing structure 103, and/or adjusting an amount of current supplied to all of, or selected ones of, electromagnets 303. In this way, the generator may perform more efficiently in the production of electricity by reducing the current used by electromagnets 101 that are not in an effective range of the armature coils 102, compensating for variations in rotational velocity of pressure vessel 100, and controlling, and/or producing less, heat inside the pressure vessel 100.

In an exemplary embodiment, a bridge rectifier circuit 301 may convert alternating current generated in the armature coils 102 to direct current. First electrical conductors 106 may carry the direct current to the center of the biasing structure 103, such as in a shaft of the biasing structure 103, and to an end of the biasing structure 103. Two exemplary arrangements for the ends of the first electrical conductors 106 include: (1) a negatively charged conductor ending at one end of the biasing structure 103 and a positively charged conductor ending at the other end of biasing structure 103; and (2) both conductors ending at the same end of biasing structure 103.

Figure 4:
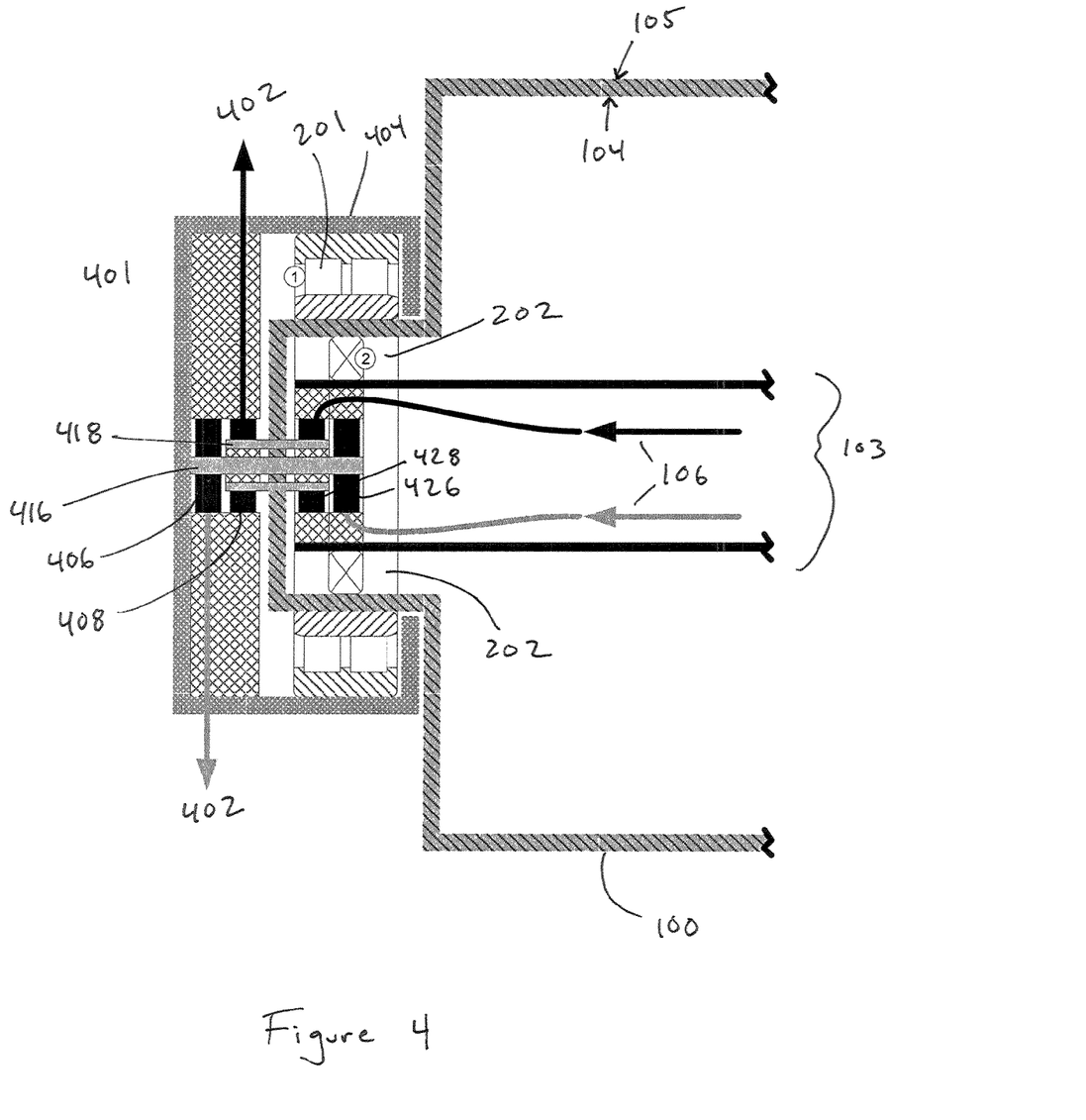
FIG. 4 depicts an exemplary transfer mechanism in accordance with an embodiment of the present invention.

With reference to FIG. 4, aspects of an exemplary transfer mechanism are depicted. At an end of the pressure vessel 100, exemplary transfer mechanism 401 may transfer the electrical current coming from the armature coils 102, via first conductors 106, to electrical conductors 402. The first conductors 106 may be attached to biasing structure internal connectors 426, 428, such as such as graphite brush connectors, or the like. The internal connectors 426, 428, may be electrically connected to, e.g. by rotating around while maintaining contact with, transfer connectors 416, 418, respectively, in a sealed hub of the pressure vessel. The transfer connectors 416, 418 may be electrically connected to, e.g. by rotating within while maintaining contact with, external connectors 406, 408, such as graphite brush connectors, or the like. External connectors 406, 408 may be electrically connected to electrical conductors 402, attached to a main bearing housing 404 that is used to support the pressure vessel 100. The current may then be carried by the electrical conductors 402 to the outside environment.

Thus, in the depicted example, the biasing structure rotates in cooperation with bearings 202, and transfers electrical current to transfer connectors 416, 418, while the pressure vessel rotates in cooperation with bearings 201, and transfers electrical current to external connectors 406, 408. This may be accomplished without a shaft of the biasing structure 103, and the associated armature coils 102, penetrating the outer surface of the pressure vessel 100, thereby greatly improving the integrity of the pressure vessel 100 from the outside environment.

Figure 5:
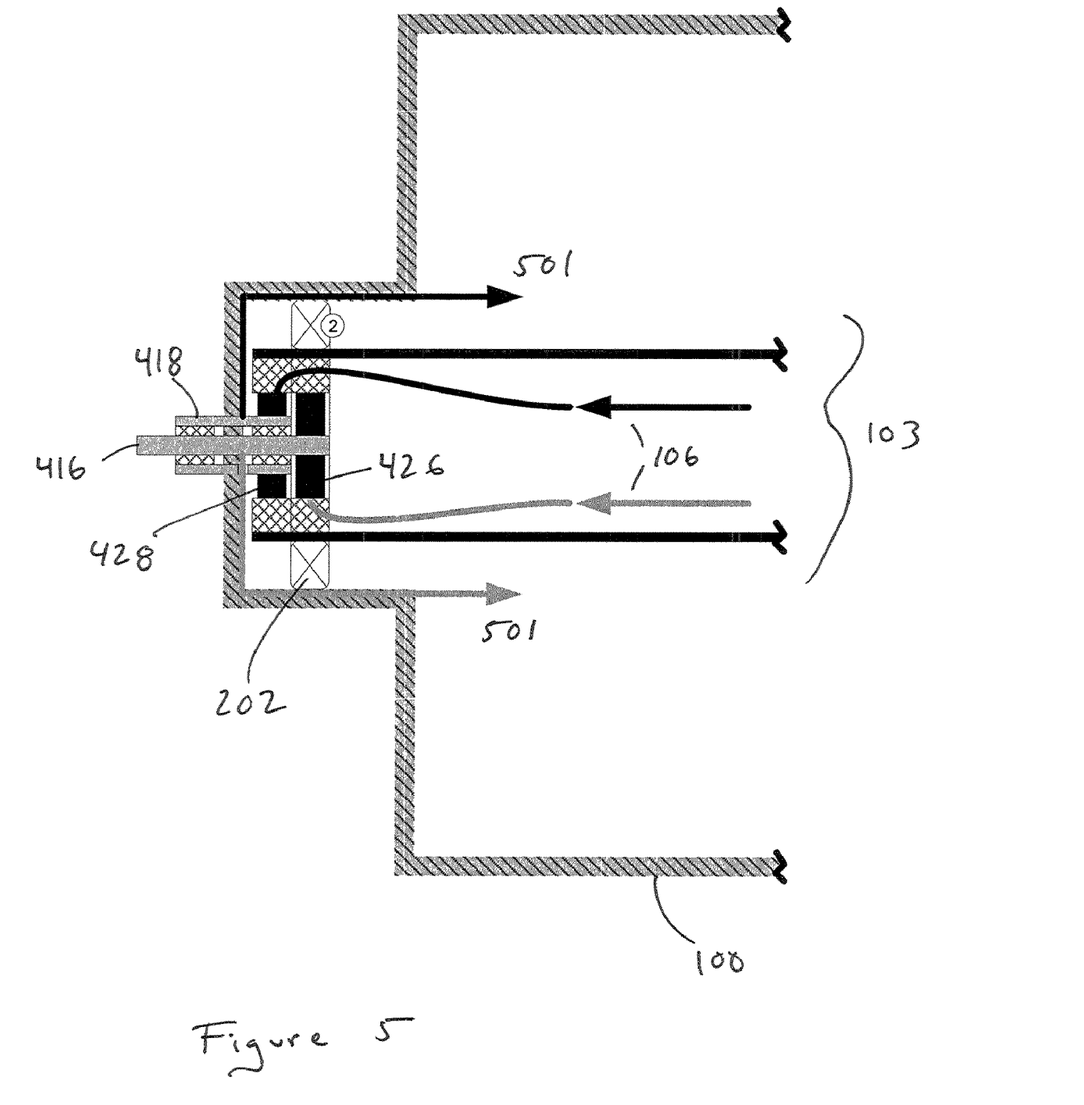
FIG. 5 depicts an exemplary transfer mechanism in accordance with an embodiment of the present invention.

With reference to FIG. 5, other aspects of an exemplary transfer mechanism are depicted. As shown in FIG. 5, second electrical conductors 501 may be used to conduct a portion of the current from the armature coils 102 to the electromagnets 101 as necessary to energize the electromagnet windings. The control system 302 may be utilized to regulate the amount of current provided to the electromagnets 101. Embodiments may also include configurations in which at least some of the electromagnets may be powered, at least partially and/or temporarily, by a current delivered from outside of the pressure vessel through a transfer mechanism via electrical conductors similar to the second electrical conductors 501. Externally supplied current may provide benefits, such as, providing an initial and/or supplemental power to the electromagnets during periods in which internal power generation means are insufficient to provide a desired level of current to the electromagnets. For example, during a start up operation, selected electromagnets may receive external power in order to provide a sufficient electromagnetic attractive force between the electromagnets and the biasing structure to rotate the biasing structure in the direction of the rotating pressure vessel to a desired operating angle.

Figure 6:
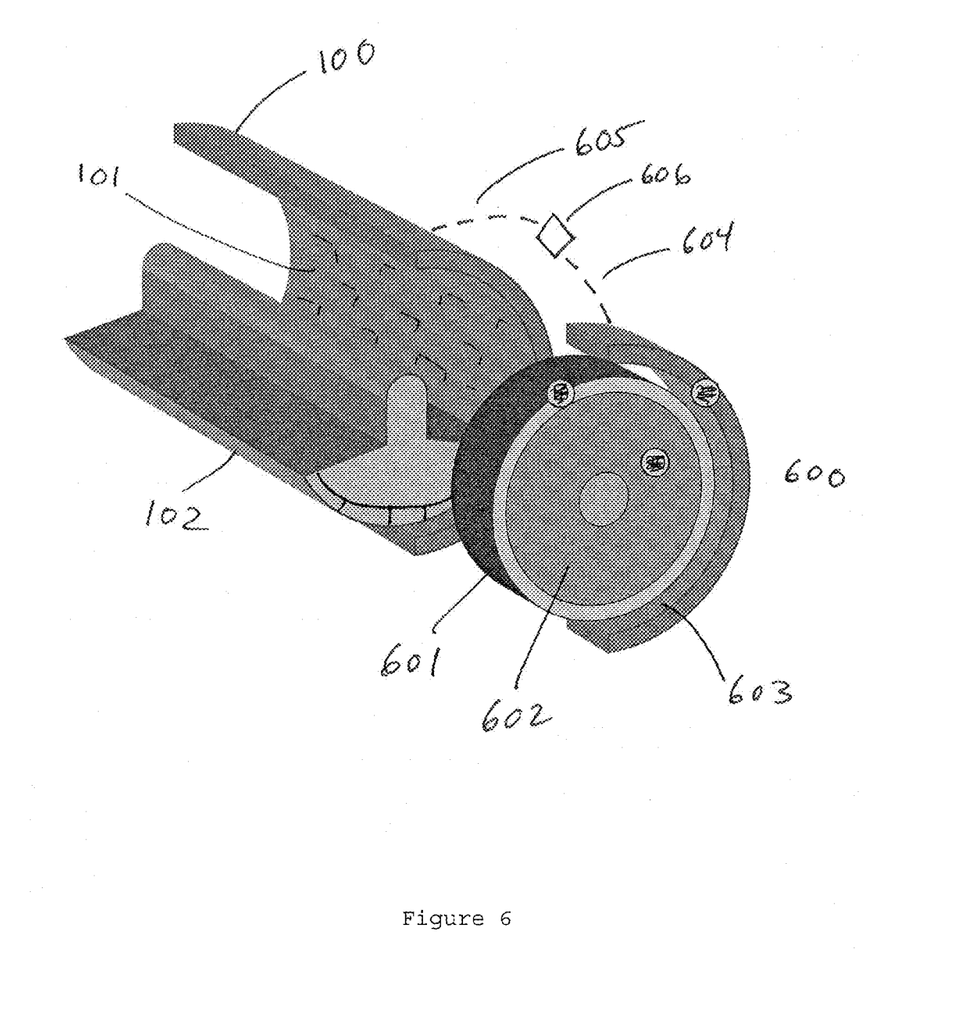
FIG. 6 depicts an isometric cut away view of an exemplary starter mechanism in accordance with an embodiment of the present invention.

With reference to FIG. 6, aspects of an exemplary starter mechanism 600 are depicted. A stator, such as a full circumference stator 602, may be rigidly attached to the biasing structure 103, and rotate with the biasing structure 103 and armature coil 102 assembly. Permanent magnets 601 may be disposed on an outer extent of the full circumference stator 602. Corresponding starter armature coils 603 may be disposed on the pressure vessel inner surface 104 opposite the permanent magnets 601. The permanent magnets 601 and starter armature coils 603 may be positioned such that relative motion between the two will induce a current in the starter armature coils 603. The starter armature coils 603 may be electrically connected using third electrical conductors 604 to a bridge rectifier circuit 606, and then electrically connected using fourth conductors 605 to the electromagnets 101.

In operation, an alternating current may be created in the starter armature coils 603 when an external torque 305 is applied to the pressure vessel 100 that causes the pressure vessel 100 to rotate and produce a relative motion between the starter armature coils 603 and the permanent magnets 601. This alternating current may be transmitted through the third electrical conductors 604 to the bridge rectifier circuit 606 that converts the alternating current into direct current. The direct current may flow through the fourth electrical conductors 605 to the electromagnets 101 to create a magnetic field. In embodiments, the starter mechanism 600 may produce enough electricity to power the electromagnets 101 when the machine is operating at full power. Because the starter is required to provide power only when spinning up from a dead stop, the starter assembly may occupy a very small fraction of the pressure vessel 100 interior.

Figure 7:
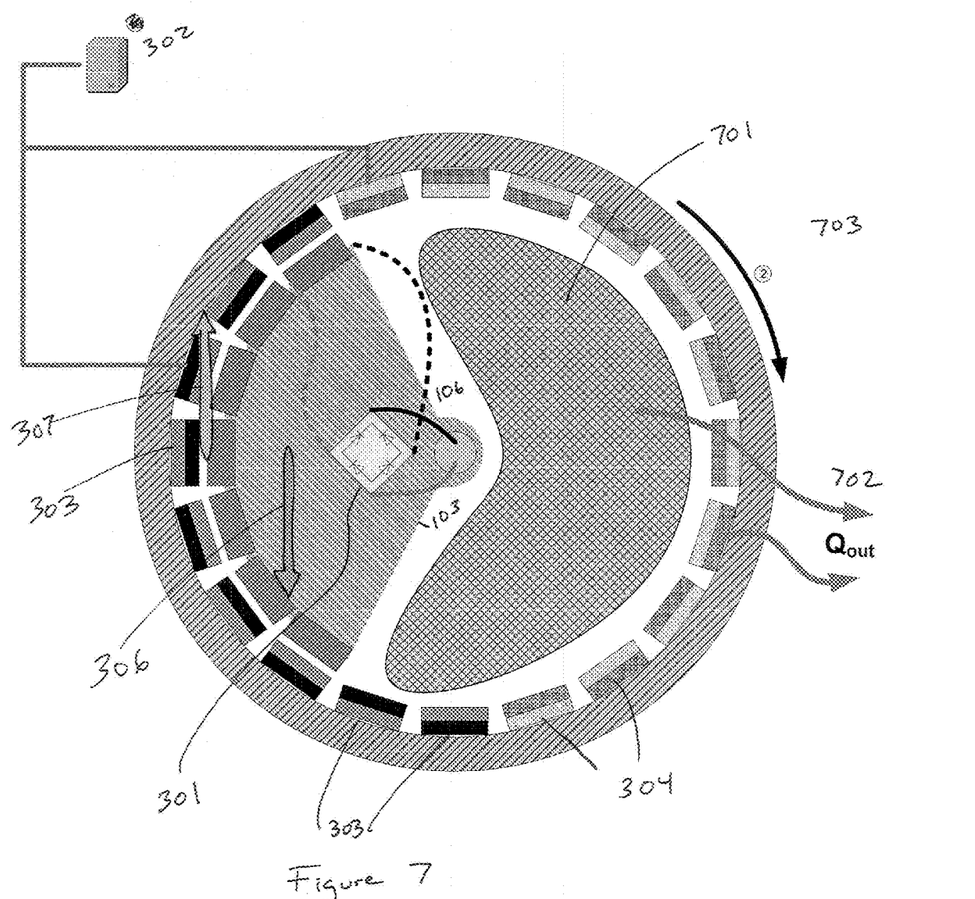
FIG. 7 depicts a sectional view of an exemplary apparatus in accordance with an embodiment of the present invention.

With reference to FIG. 7, further details are provided with respect to an exemplary embodiment and related heat transfer mechanism. As shown in FIG. 7, the gravitational force 306 of the biasing structure 103 and armature coils 102 is offset by the resistive electromagnetic force 307 created by the interaction of the energized electromagnets 303 and the armature coils 102, leaving the biasing structure 103 suspended at an angle θ. Electromagnets 303 may be selectively energized as they approach the effective range of the armature coils 102 and de-energized as they rotate beyond the armature coils 102. The current supplied to the electromagnets 303 may be controlled to maintain the biasing structure at angle θ, or other predetermined angular range.

A mechanism for heat removal is an important aspect because all electrical generation systems produce significant amounts of thermal waste. According to an embodiment of the invention, there are no interfaces in the pressure vessel walls 104 and 105 through which cooling fluids can pass, which may preclude the use of some conventional cooling techniques. Thus, embodiments may include the space inside the pressure vessel 100, that is not occupied by a solid object, being occupied by a thermally conducting internal fluid 701. The internal fluid 701 may absorb heat that is created by the generator, and transfer the heat 702 to the pressure vessel surfaces 104 and 105, where it may be conducted and radiated to the outside environment and carried away by the environmental fluid 703 surrounding the pressure vessel 100. The internal fluid 701 in the present embodiment may have high thermal conductivity and a low molecular weight, such as hydrogen. The fluid may be circulated by a pumping action induced by shearing in the spaces between the biasing structure 103 and the electromagnets 101.

Figure 8:
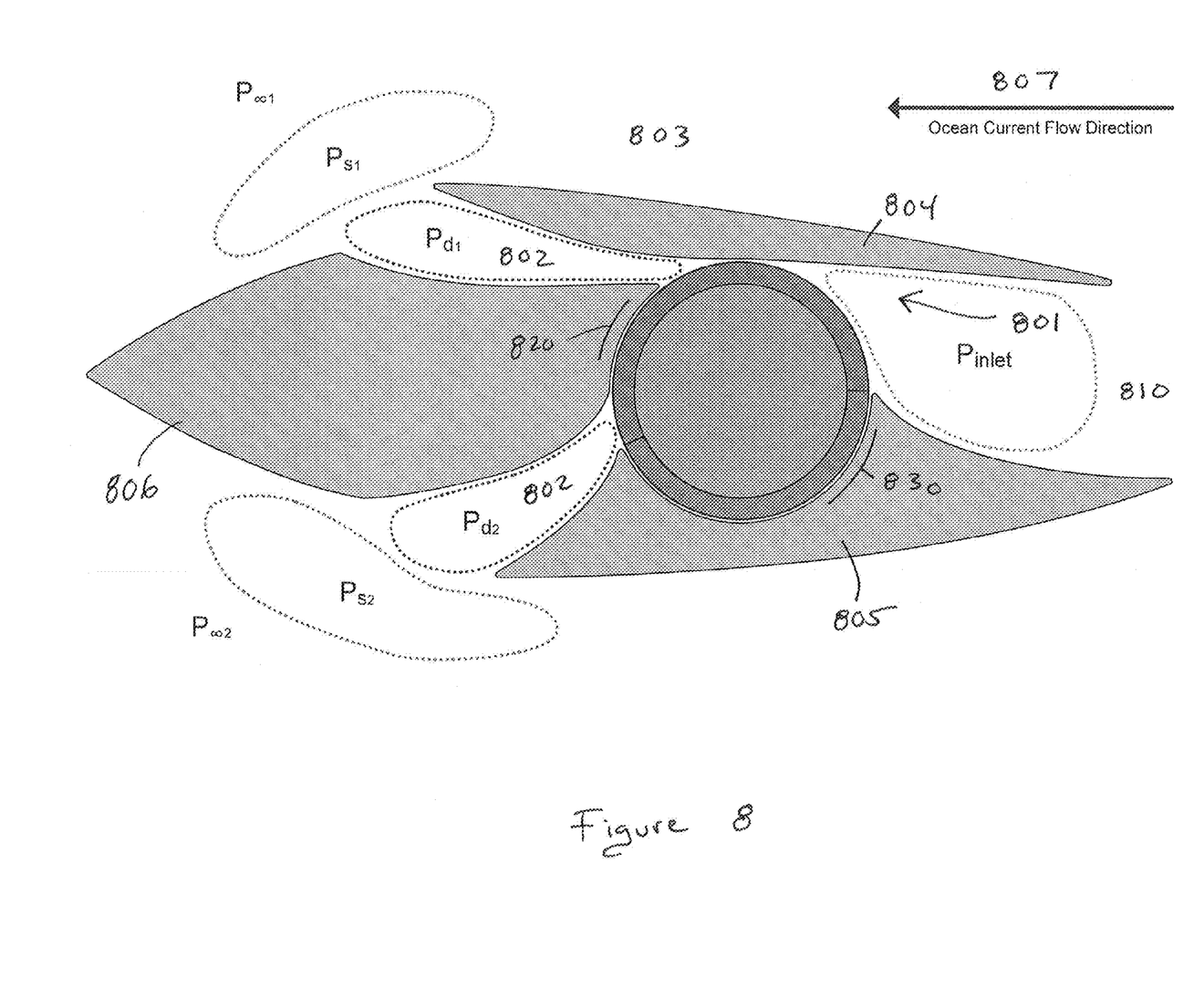
FIG. 8 depicts an exemplary outer housing in accordance with an embodiment of the present invention.

With reference to FIG. 8, an exemplary outer housing according to embodiments is shown. In FIG. 8, a cross-sectional view of the pressure vessel 100 and exemplary exterior housing 803 is shown. In embodiments, the exterior housing 803 may be configured to channel an environmental fluid 703 against a portion of the pressure vessel outer surface 105. For example, the exterior housing 803 may include an upper section 804, a lower section 805, and a rear section 806. The upper 804 and lower 805 sections may have leading portions that extend partly away from the pressure vessel 100 defining an inlet 810, depicted in FIG. 8 as in the opposite direction of the environmental fluid flow direction 807. Depending on the configuration of the outer surface 105, the upper section 804 and the pressure vessel 100 may be separated at an appropriate distance to allow the external fluid 703 to act on the outer surface 105 and create flow through the exterior housing 803. In embodiments, the outer surface 105 may include blades that are configured to be pushed by the current flow 807 while in an active region 820. The exterior housing 803 may be configured such that the inlet 810 diverts the flow into the housing away from a dead region 830, thereby reducing the resistance to effective rotation of the pressure vessel 100, e.g. counter-clockwise in FIG. 8. The lower section 805 may extend partially toward the upper section 804 without attaching to that surface. This configuration may be used to enhance an accelerated inlet flow 801.

The rear section 806 may be positioned on the downstream side of the pressure vessel 100 and extend a distance away from the pressure vessel in the direction of fluid flow 807. The rear section 806 may be configured to form at least one exhaust in coordination with trailing edges of upper 804 and lower 805 portions. As shown in FIG. 8, exhaust channels 802 may be formed with cross-sectional areas that expand in the direction of the flow. Such exhaust channels 802 may provide diffusing flow regions with associated lower pressure regions $P_{d1}$ and $P_{d2}$. The cross-sectional shape of the exterior housing 803 may also present a wing-shaped profile, with outlets of exhaust channels 802 being located in a trailing edge region of the wing shape. Thus, reduced pressure regions $P_{S1}$ and $P_{S2}$ may be formed in the outlet regions of exhaust channels 802 through an increase in the speed of the exterior fluid flow in these regions. Used alone, or in combination, the described configurations of the exhaust channels and cross-sectional profile can be used to enhance the flow through the exterior housing, particularly with respect to enhancing the effective flow against the active area 820 of pressure vessel 100, and improve the efficiency of the generator when operating in a fluid flow.

According to aspects of the invention, methods may include providing a generator, such as that shown in FIG. 1 and described above, and generating electrical power by subjecting the pressure vessel outer surface to a flowing fluid, which may be provided by various sources, such as, a dam, a river, or open ocean currents.

Figure 9:
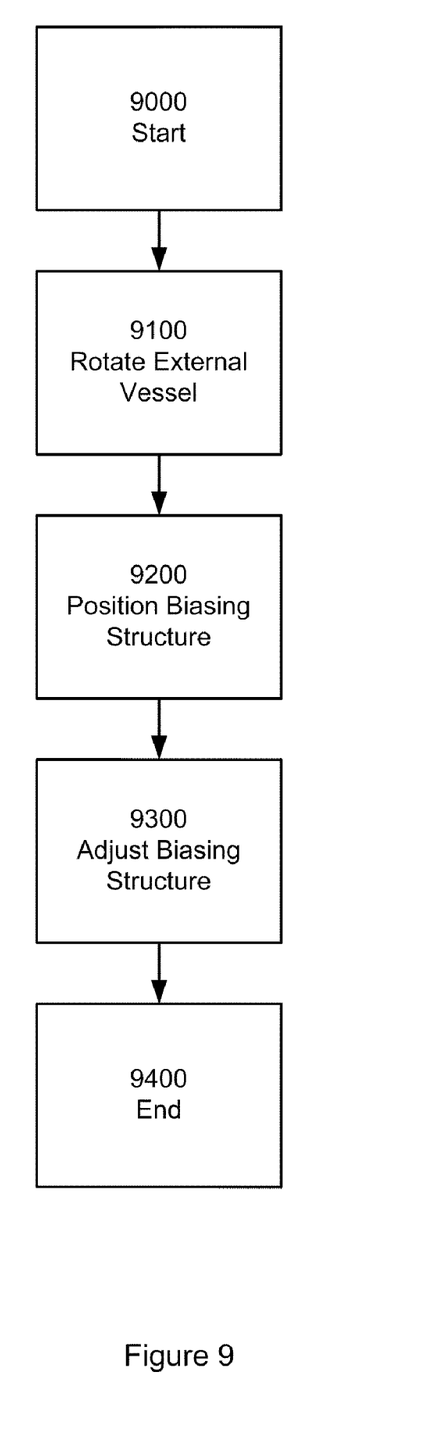
FIG. 9 depicts an exemplary method according to an embodiment of the present invention.

As shown in FIG. 9, an exemplary method may begin with S9000 during which steps such as positioning the generator and other preparations may be made. Once the generator is positioned, such as at depth in an open ocean current, the method may proceed to S9100. During S9100, the external pressure vessel of the generator may be allowed to rotate based on a torque applied to the pressure vessel, such as by blades, vanes, or other shapes, irregularities and the like, that interact with a fluid flow across the outer surface. The method may continue with S9200. During S9200, a biasing structure of the generator may be positioned, such as by rotating the biasing structure to an operating angle. For example, when electromagnets are used on the inner surface of the pressure vessel, a current may be supplied to the electromagnets to create an attractive electromagnetic force between the rotating pressure vessel and a hanging biasing structure. As the biasing structure rotates in the direction of the pressure vessel's rotation, a counter moment acting on the biasing structure is increased due to a gravitational force on the biasing structure. Thus, the biasing structure may be substantially stabilized at an operating angle when the gravitational counter moment reaches the rotational force applied by the electromagnets. As described herein, an initial current may be supplied to the electromagnets via an external power source and/or an internal starter mechanism. The method may continue with S9300.

In S9300 an angle of the biasing structure may be adjusted. Such adjustments may be automatically controlled, for example in real time, by monitoring parameters such as a rotational speed of the pressure vessel, and/or a sensed angle of the biasing structure, and comparing that with a predetermined, or desired, parameter such as rotational speed and/or operating angle. Exemplary methods may include automatically controlling a current applied to selected electromagnets in order to correct and/or maintain the biasing structure at a predetermined, or desired, operating angle or range, e.g. 80-100°, 45-90° etc. from dead hang. Such features may be advantageous in addressing factors such as changes in rotational speed of the pressure vessel, and the like, that may change the net torque applied to the biasing structure. During the foregoing steps, electricity may be generated while the pressure vessel rotates relative to the biasing structure. The method may continue with S9400, where the method ends.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item

What is claimed is:

1. A hydroelectric generator comprising:
    a rotatable cylindrical pressure vessel, said pressure vessel having an inner and outer surface;

a plurality of electromagnets disposed on said inner surface of said pressure vessel;
a biasing structure configured to rotate within, and independently of, said pressure vessel and extending at least partly along a lengthwise dimension of said pressure vessel, said biasing structure having an axis of rotation that is substantially parallel and coincident with a center axis of said pressure vessel, and a center of gravity of said biasing structure at a radius away from said center axis of said pressure vessel;
a plurality of armature coils disposed on an outer portion of said biasing structure, said plurality of armature coils positioned such that a relative motion between said electromagnets and said plurality of armature coils induces a current in said armature coils when a current is applied to said electromagnets; and
a transfer mechanism configured to transfer electrical current from first electrical conductors connected to said armature windings to an outside of said pressure vessel.

2. A hydroelectric generator comprising:
a rotatable pressure vessel, said pressure vessel having an inner and outer surface;
a plurality of first magnets disposed on said inner surface of said pressure vessel;
a biasing structure extending at least partly along a lengthwise dimension of said pressure vessel, said biasing structure having an axis of rotation that is within a circumference of said pressure vessel, a center of gravity of said biasing structure at a radius away from a center axis of said pressure vessel; and
a plurality of armature coils disposed on said biasing structure and positioned such that relative motion between said first magnets and said plurality of armature coils induces a current in said armature coils.

3. The generator of claim 2, wherein said axis of rotation of said biasing structure is located substantially coincident with said center axis of said pressure vessel.

4. The generator of claim 2, wherein said biasing structure further comprises a rotatable shaft configured to rotate independently of said pressure vessel, said shaft parallel to and coincident with said center axis of said pressure vessel.

5. The generator of claim 2, wherein said first magnets are electromagnets and said relative motion between said first magnets and said plurality of armature coils induces a current in said armature coils when current is applied to said first magnets.

6. The generator of claim 2, wherein said pressure vessel has no openings penetrating said inner surface and said outer surface through which mechanical energy is transmitted.

7. The generator of claim 2, wherein said first magnets are electromagnets, the generator further comprising:
a control system connected to said first magnets, said control system configured to selectively apply current to said first magnets during rotation of said pressure vessel.

8. The generator of claim 7, wherein said control system is configured to stop supplying current to selected first magnets of said plurality of first magnets based on at least one of:
when said selected first magnets are outside of an effective range with respect to said armature coils; and
a position of said selected first magnets with respect to said biasing structure.

9. The generator of claim 4, wherein said shaft has a hollow interior and first electrical conductors located in said hollow interior of said shaft, said first electrical conductors connected to said armature windings.

10. The generator of claim 2, further comprising:
a transfer mechanism configured to transfer electrical current from first electrical conductors connected to said armature windings to an outside of said pressure vessel.

11. The generator of claim 10, further comprising:
second electrical conductors completing an electrical circuit between said transfer mechanism and windings of said first magnets.

12. The generator of claim 2, further comprising:
a thermally conducting fluid filling an interior of said pressure vessel.

13. The generator of claim 2, wherein said first magnets are electromagnets, the generator further comprising:
a starter mechanism comprising:
a rotor having permanent magnets disposed around said rotor;
starter armature coils disposed opposite said permanent magnets; and
third electrical conductors completing an electrical circuit between said starter armature coils and said first magnets,
wherein said permanent magnets and said starter armature coils are positioned opposite to one another at a distance such that relative rotation between said permanent magnets and said starter armature coils produces a current in said starter armature coils.

14. The generator of claim 13, wherein said electrical circuit between said starter armature coils and said first magnets comprises a rectifier between said starter armature coils and said first magnets.

15. The generator of claim 2, wherein said biasing structure is configured to maintain an operational rotational orientation using a gravitational force to offset a rotational force created by an electro-magnetic interaction of said first magnets and said armature coils.

16. The generator of claim 2, wherein said biasing structure is configured such that a gravitational force acting on said biasing structure contributes to a relative rotation between said biasing structure and said pressure vessel when said pressure vessel is rotating.

17. The generator of claim 2, wherein at least some of said plurality of first magnets are electromagnets and are configured to be powered, at least temporarily, by a current delivered from outside said pressure vessel through a transfer mechanism.

18. A method of generating hydroelectric power with a generator including a pressurized rotatable pressure vessel and a biasing structure that is within the pressure vessel and extends at least partly along a lengthwise dimension of the pressure vessel, the method comprising:
at least partially submerging the generator underwater;
allowing the pressure vessel to rotate relative to the biasing structure;
providing a current to electromagnets disposed within the pressure vessel; and
controlling an operating angle of the biasing structure by adjusting the current.

19. The method of claim 18, wherein said providing a current to electromagnets disposed within the pressure vessel includes providing an initial current at least partly from a power source that is external to the pressure vessel, and providing an operating current at least partly from a power source that is internal to the pressure vessel.

* * * * *